(12) United States Patent
Ogawa et al.

(10) Patent No.: US 9,885,624 B2
(45) Date of Patent: Feb. 6, 2018

(54) STRAIN SENSOR, AND LOAD DETECTION DEVICE USING SAME

(71) Applicant: PANASONIC INTELLECTUAL PROPERTY MANAGEMENT CO., LTD., Osaka (JP)

(72) Inventors: Takaaki Ogawa, Osaka (JP); Kazuhiro Nomura, Fukui (JP); Akira Matsuura, Osaka (JP); Masahiko Obayashi, Osaka (JP); Kouichi Aburata, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/128,075

(22) PCT Filed: Feb. 17, 2015

(86) PCT No.: PCT/JP2015/000708
§ 371 (c)(1),
(2) Date: Sep. 21, 2016

(87) PCT Pub. No.: WO2015/145949
PCT Pub. Date: Oct. 1, 2015

(65) Prior Publication Data
US 2017/0102282 A1    Apr. 13, 2017

(30) Foreign Application Priority Data

Mar. 28, 2014    (JP) .................................. 2014-068354

(51) Int. Cl.
G01B 7/16      (2006.01)
G01L 5/22      (2006.01)
G01L 1/22      (2006.01)

(52) U.S. Cl.
CPC ............ *G01L 5/225* (2013.01); *G01L 1/2206* (2013.01)

(58) Field of Classification Search
CPC ......... G01L 1/2206; G01L 5/225; G01B 7/18; G01B 5/30
(Continued)

(56) References Cited

U.S. PATENT DOCUMENTS

2004/0007357 A1*  1/2004  Gabler ................ E21B 47/0006
                                              166/250.01
2006/0162434 A1*  7/2006  Saito ..................... B60T 7/042
                                              73/132

(Continued)

FOREIGN PATENT DOCUMENTS

JP      S60-033625 U    3/1985
JP      3419408 B2      6/2003
(Continued)

OTHER PUBLICATIONS

The Extended European Search Report dated Feb. 6, 2017 for the related European Patent Application No. 5768253.5.
(Continued)

*Primary Examiner* — Lisa Caputo
*Assistant Examiner* — Nigel Plumb
(74) *Attorney, Agent, or Firm* — McDermott Will & Emery LLP (57) ABSTRACT

The present invention includes a strain body having a connecting part and a fixing part, and a first strain detection element disposed on the strain body. The strain body includes a void, and the first strain detection element is disposed between the connecting part and the void.

12 Claims, 8 Drawing Sheets

(58) Field of Classification Search
USPC .................................. 73/767, 763, 781, 760
See application file for complete search history.

(56) References Cited

U.S. PATENT DOCUMENTS

| | | | | |
|---|---|---|---|---|
| 2008/0060452 A1* | 3/2008 | Fujiwara | .............. | G01G 3/1408 |
| | | | | 73/862.381 |
| 2009/0064792 A1* | 3/2009 | Kawabata | ............. | G01L 1/2206 |
| | | | | 73/781 |
| 2011/0290066 A1* | 12/2011 | Fujiwara | ................ | B60T 7/042 |
| | | | | 74/514 |

FOREIGN PATENT DOCUMENTS

| | | |
|---|---|---|
| JP | 4230500 B2 | 2/2009 |
| JP | 2009-063494 A | 3/2009 |
| JP | 2011-247702 A | 12/2011 |

OTHER PUBLICATIONS

International Search Report and Written Opinion issued in corresponding International Patent Application No. PCT/JP2015/000708, dated Apr. 7, 2015; with partial English translation.

* cited by examiner

STRAIN SENSOR, AND LOAD DETECTION DEVICE USING SAME

RELATED APPLICATIONS

This application is the U.S. National Phase under 35 U.S.C. §371 of International Patent Application No. PCT/JP2015/000708, filed on Feb. 17, 2015, which in turn claims the benefit of Japanese Application No. 2014-068354, filed on Mar. 28, 2014, the disclosures of which Applications are incorporated by reference herein.

TECHNICAL FIELD

The present invention relates to a strain sensor for detecting various loads including a treading load of vehicular pedals, a cable tension of a vehicular parking brake, and a seat surface load of a vehicular seat, and the like.

BACKGROUND ART

Conventionally, a strain sensor that detects a strain of a strain body has been used to detect a treading load of vehicular pedals.

Figure 9:
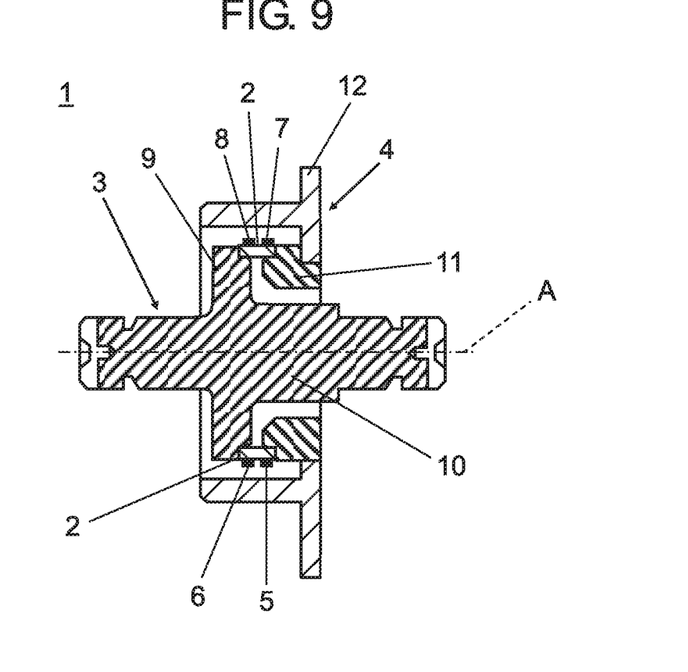
FIG. 9 illustrates a conventional strain sensor.

FIG. 9 is a cross-sectional view illustrating a structure of a conventional strain sensor.

As illustrated in FIG. 9, conventional strain sensor 1 includes strain body 2, fixing member (first member) 3, and displacement member (second member) 4, which are arranged concentrically to one another. First strain resistance element (strain detection element) 5 is disposed on an outer surface at a lower part of strain body 2. One end of first strain resistance element 5 is electrically connected to a power supply electrode (not illustrated) through a circuit pattern (not illustrated). The other end of first strain resistance element 5 is electrically connected to a second output electrode (not illustrated). Second strain resistance element (strain detection element) 6 is disposed substantially in parallel with first strain resistance element 5, on an outer surface at the lower part of strain body 2. One end of second strain resistance element 6 is electrically connected to the power supply electrode through a circuit pattern (not illustrated). The other end of second strain resistance element 6 is electrically connected to a first output electrode (not illustrated).

Third strain resistance element (strain detection element) 7 is disposed on an outer surface at an upper part of strain body 2. One end of third strain resistance element 7 is electrically connected to first strain resistance element 5 and the second output electrode through a circuit pattern (not illustrated). The other end of third strain resistance element 7 is electrically connected to a GND electrode (not illustrated).

Further, fourth strain resistance element (strain detection element) 8 is disposed substantially in parallel with third strain resistance element 7 on the outer surface at the upper part of strain body 2. One end of fourth strain resistance element 8 is electrically connected to second strain resistance element 6 and the first output electrode through a circuit pattern. The other end of fourth strain resistance element 8 is electrically connected to the GND electrode. A full bridge circuit is configured as above.

Ferritic stainless steel fixing member (first member) 3 includes disk-shaped attachment part 9 and shaft part 10 integrally including attachment part 9 at an intermediate part in a longitudinal direction. An outer circumferential part of attachment part 9 is welded to strain body 2 while being engaged with a side edge of strain body 2, in a state in which attachment part 9 blocks one end opening of strain body 2. One end part of shaft part 10 of fixing member 3 penetrates through an inner side of strain body 2. Displacement member (second member) 4 made of metal (for example, ferritic stainless steel) is configured with annular washer 11 and cylindrical attachment member 12 for functioning as a case that is fixed to one end of washer 11. At an inner side of attachment member 12, an outer circumferential part of washer 11 is fixed to an opening edge of the other end part of strain body 2 by welding, while being engaged with strain body 2. Cylindrical attachment member 12 for functioning as the case accommodates attachment part 9, strain body 2, and washer 11.

In conventional strain sensor 1 illustrated in FIG. 9, a load is applied to displacement member 4 in a direction perpendicular to shaft center A in strain body 2, and therefore shearing force is applied to strain body 2 (PTL 1).

Subsequently, another strain sensor will be described with reference to FIG. 10.

Figure 10:
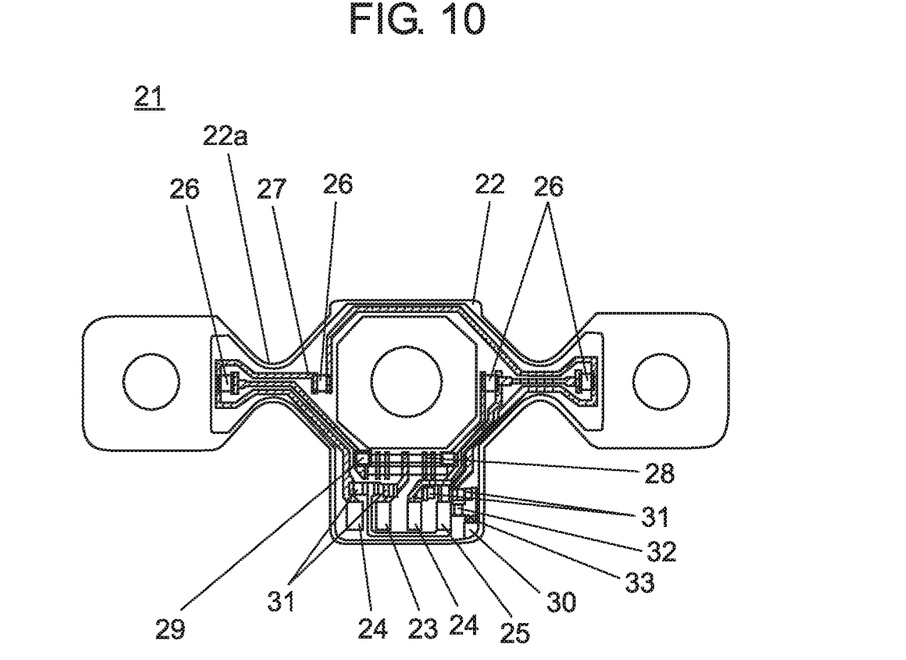
FIG. 10 illustrates a conventional strain sensor.

FIG. 10 is a top view of the other conventional strain sensor.

As illustrated in FIG. 10, strain sensor 21 is configured with insulation substrate 22 and a bridge circuit. Further, the bridge circuit is configured such that power supply electrode 23, a pair of output electrodes 24, and GND electrode 25, which are made of silver and are provided on an upper surface of insulation substrate 22, and four strain resistance elements 26 are electrically connected to one another through circuit patterns 27.

At least a pair of temperature characteristic adjusting resistors 28 is disposed on the upper surface of insulation substrate 22. One ends of temperature characteristic adjusting resistors 28 each are electrically connected to power supply electrode 23, and the other ends of temperature characteristic adjusting resistors 28 each are electrically connected to strain resistance elements 26 through a pair of resistance value measuring electrodes 29. In addition, frame GM) electrode 30 is disposed on the upper surface of insulation substrate 22. Furthermore, capacitor 31 and electrostatic discharge resistor 32 are electrically connected in parallel with each other between frame GM) electrode 30 and GM) electrode 25 through circuit patterns 27. Slit part 33 is disposed in circuit patterns 27 of insulation substrate 22 to disconnect a part of one of circuit patterns 27. Four strain resistance elements 26 disposed on the upper surface of insulation substrate 22 are divided into two pairs. Further a portion between two strain resistance elements 26 included in each of two divided pairs of strain resistance elements 26 in insulation substrate 22 is made thinner to configure thin width part 22a.

When shearing load is applied to a center part of insulation substrate 22, a strain is generated on a surface of insulation substrate 22 due to the shearing load. Further, strains are also generated in four strain resistance elements 26 disposed on the upper surface of insulation substrate 22. The strains generated in strain resistance elements 26 each change resistance values of corresponding strain resistance elements 26. Then, the changes in the resistance values of strain resistance elements 26 are output from the pair of output electrodes 24 to an external computer (not illustrated), and thus a load applied to insulation substrate 22 can be measured (PTL 2).

CITATION LIST

Patent Literature

PTL 1: Japanese Patent No. 4,230,500
PTL 2: Japanese Patent No. 3,419,408

SUMMARY OF THE INVENTION

However, in PTL 1, there is a problem in that a number of components of a strain sensor is increased and therefore the strain sensor becomes expensive. Meanwhile, in PTL 2, a strain is detected through a shearing load. Then, when a load of a brake pedal is detected by using a strain sensor in PTL 2, there is a problem in that a size of a load detection device becomes large.

To solve the above described problems, one aspect of a strain sensor of the present invention includes a strain body including a connecting part and a fixing part, and a first strain detection element disposed on the strain body. The strain body includes a void, and the first strain detection element is disposed between the connecting part and the void.

Another aspect of the strain sensor of the present invention includes a strain body including a connecting part and a fixing part, and a first strain detection element disposed on the strain body. The first strain detection element is disposed between the connecting part and the fixing part. The fixing part is located in a direction of external force applied to the connecting part relative to the connecting part. The strain detection element detects a compressive stress generated between the connecting part and the fixing part.

With the above configuration, the present invention can be configured with a small number of components at a reduced cost, and can reduce a size of a brake system.

DESCRIPTION OF EMBODIMENTS

First Exemplary Embodiment

Hereinafter, a strain sensor of a first exemplary embodiment of the present invention will be described with reference to drawings.

Figure 1:
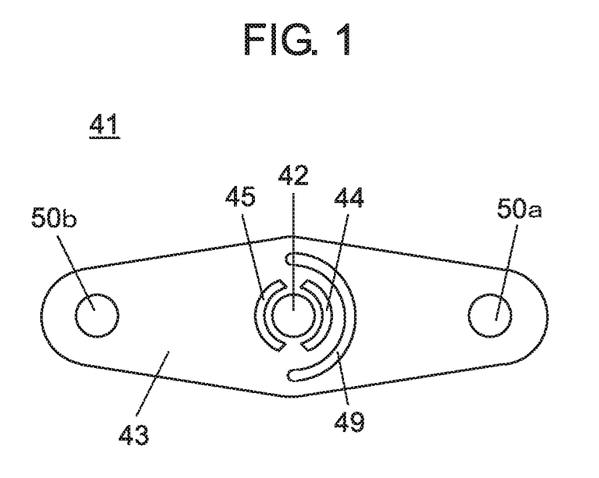
FIG. 1 is a front view of a strain sensor of a first exemplary embodiment of the present invention.
Figure 2:
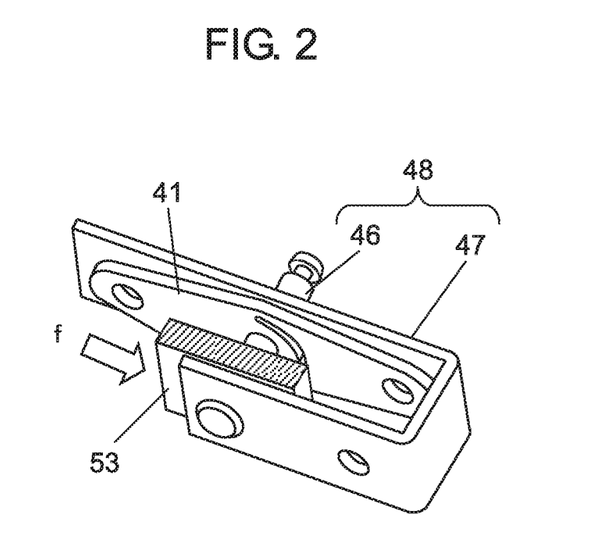
FIG. 2 is a perspective view of the strain sensor of the first exemplary embodiment of the present invention.

FIG. 1 is a front view of a strain sensor of the first exemplary embodiment of the present invention, and FIG. 2 is a perspective view of the strain sensor of the first exemplary embodiment of the present invention.

As illustrated in FIGS. 1, and 2, strain sensor 41 of the first exemplary embodiment of the present invention includes plate-shaped strain body 43 disposed with connecting part 42, first strain detection element 44 disposed on strain body 43, and second strain detection element 45 disposed on strain body 43. A through hole is formed at a center part of plate-shaped strain body 43, and thus connecting part 42 is formed. Crevice pin 46 is inserted into connecting part 42 to connect connecting part 42 to transmission member 48 including crevice 47 and crevice pin 46. Void 49 that is a through hole and has an arc shape is formed near connecting part 42 of strain body 43. First strain detection element 44 is disposed between void 49 and connecting part 42.

Second strain detection element 45 is disposed at a position opposite to a position where first strain detection element 44 is disposed, relative to connecting part 42 of strain body 43. Further, first fixing part. 50a and second fixing part 50b are disposed in strain body 43. Screws 51 (illustrated in FIG. 3) are fitted into fixing parts 50a, 50b to fix strain body 43 to crevice 47. Note that a shape of strain body 43 is not limited to a rhombus having rounded corners as illustrated in FIG. 1, but may be a shape such as a rectangle or a circle.

That is, strain sensor 41 of the present exemplary embodiment includes strain body 43 including connecting part 42 and fixing part 50a, and first strain detection element 44 disposed on strain body 43. Further, strain body 43 includes void 49, and first strain detection element 44 is disposed between connecting part 42 and void 49.

Subsequently, a manufacturing method of strain sensor 41 will be described.

First, a plate made of stainless steel (not illustrated) is pressed to form void 49. A glass paste (not illustrated) is printed on the plate, and then the plate is fired at about 550° C. for about 10 minutes to form strain body 43.

Next, a silver paste (not illustrated) is printed on one surface of strain body 43, and strain body 43 is fired at about 550° C. for about 10 minutes to form a power supply electrode (not illustrated), an output electrode (not illustrated), a GND electrode (not illustrated), and circuit patterns on the surface of strain body 43.

Then, a resistive paste (not illustrated) is printed on the other surface of strain body 43, and then strain body 43 is fired at about 550° C. for about 10 minutes to form first strain detection element 44.

A detection method of strain sensor 41 of the first exemplary embodiment of the present invention, which is formed as described above, will be described.

Figure 3:
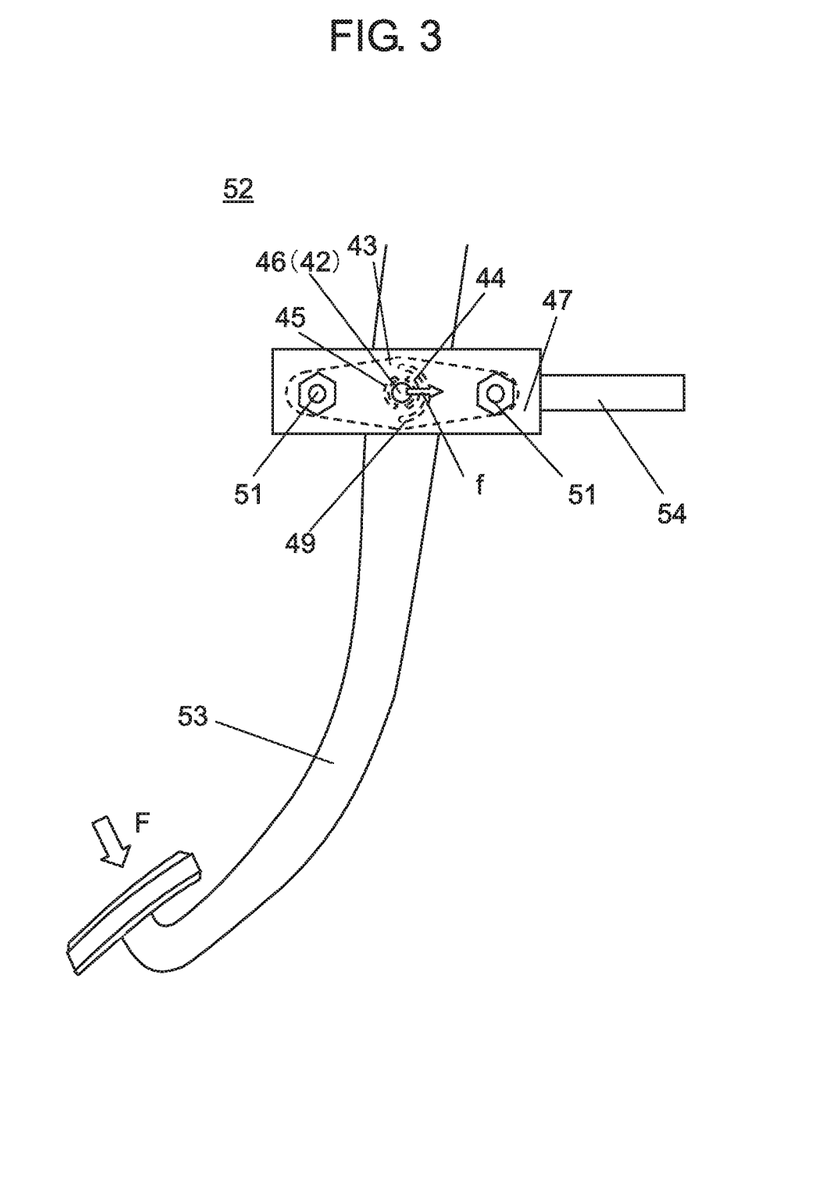
FIG. 3 is a side view of a load detection device of the first exemplary embodiment of the present invention.

FIG. 3 is a side view of a load detection device using strain sensor 41 of the first exemplary embodiment of the present invention. In load detection device 52 illustrated in FIG. 3, when pedal force F is applied to input member 53 including a pedal arm, pedal force F is transmitted to crevice pin 46 through input member 53, and further is transmitted from crevice pin 46 to operating rod 54 through crevice 47.

External force f is transmitted from crevice pin 46 to crevice 47. Simultaneously, connecting part 42 of strain sensor 41 is pressed by crevice pin 46, and then a stress is applied to strain sensor 41. At this time, fixing parts 50a, 50b are screwed to crevice 47, and therefore strain body 43 is fixed to crevice 47. Accordingly, a compressive stress is applied between connecting part 42 and first fixing part 50a, and a strain is then generated in first strain detection element 44. Resistance of first strain detection element 44 is then changed. This resistance change of first strain detection element 44 is measured to detect the compressive stress generated between connecting part 42 and fixing part 50a. That is, measuring the resistance change of first strain detection element 44 enables measuring pedal force F applied to load detection device 52.

Figure 4:
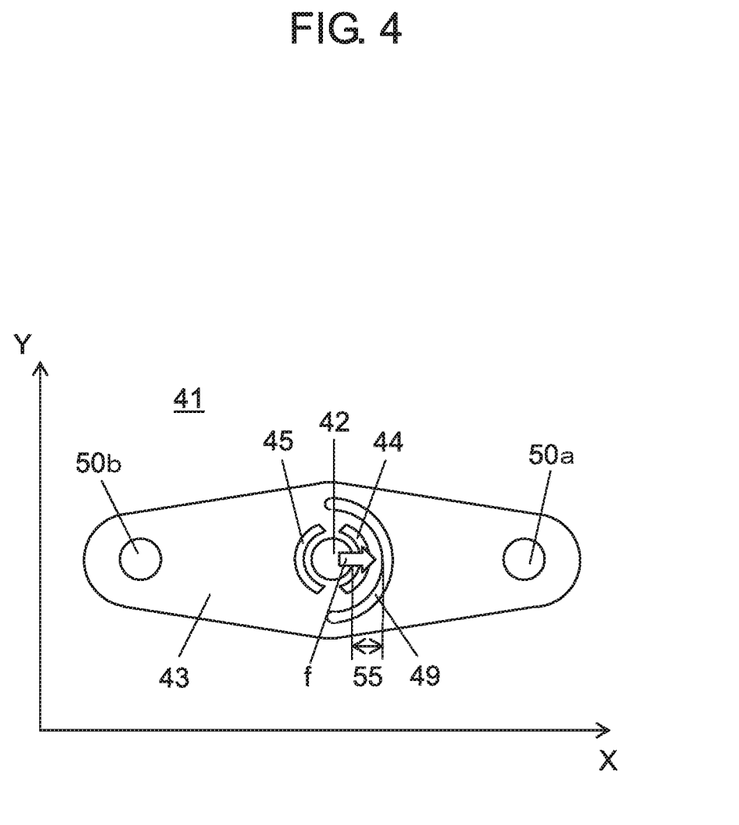
FIG. 4 illustrates a state of a strain body of the strain sensor of the first exemplary embodiment of the present invention.

FIG. 4 illustrates a state of strain body 43 when external force f is applied to strain sensor 41 of the first exemplary embodiment of the present invention. An X-axis represents a direction that connects connecting part 42 to fixing part 50a, and a Y-axis represents a direction perpendicular to the X-axis. As illustrated in FIG. 4, when pedal force F is transmitted, as external force f, to strain body 43 through connecting part 42 connected to crevice pin 46, region 55 between connecting part 42 and void 49 strains. By making a portion that is farther toward a positive direction side of the X-axis (right side of first strain detection element 44) than a position disposed with first strain detection element 44 easy to strain, a portion disposed with first strain detection element 44 is made easy to strain. With void 49 formed, region 55 is made easy to strain, and therefore detection sensitivity of strain sensor 41 can be improved.

In other words, connecting part 42, first strain detection element 44, and void 49 are arranged in this order, along a direction of external force f applied to connecting part 42.

Note that although the external force is denoted by a rightward arrow in FIG. 4, input member 53 (illustrated in FIG. 3) is actually rotated counter-clockwise around connecting part 42, as pedal force F is applied to input member 53. Accordingly, the direction of external force f applied to the connecting part is gradually changed counter-clockwise as input member 53 is rotated.

Moreover, void 49 is more preferably formed at a position closer to connecting part 42 than a center between connecting part 42 and fixing part 50a. With this configuration, first strain detection element 44 is made easy to be deformed when the stress is applied between connecting part 42 and fixing part 50a. Accordingly, a strain to be generated in first strain detection element 44 is increased, and thus detection sensitivity for the external force applied to strain sensor 41 can be improved. In particular, it is effective to form void 49 near connecting part 42.

Moreover, strain sensor 41 of the first exemplary embodiment of the present invention uses first strain detection element 44 and second strain detection element 45, and detects the stress applied to strain sensor 41 by acquiring a difference between a resistance change of first strain detection element 44 and a resistance change of second strain detection element 45. Therefore, even when an ambient environment temperature changes and a temperature characteristic of first strain detection element 44 is then changed, influence caused by the change in ambient temperature is reduced, since the stress is measured by acquiring the difference between the outputs of first strain detection element 44 and second strain detection element 45.

That is, strain sensor 41 of the first exemplary embodiment more preferably includes second strain detection element 45 disposed on strain body 43. Second strain detection element 45 is disposed at the position opposite to the position where first strain detection element 44 is disposed, relative to connecting part 42.

As is clear from the above description, strain sensor 41 of the first exemplary embodiment of the present invention is attached to crevice pin 46 that is transmission member 48 such that the compressive stress is generated in strain body 43, and can detect the compressive stress generated in strain body 43. Therefore, it is possible to configure strain sensor 41 with a small number of components, and to provide an inexpensive strain sensor.

Moreover, strain sensor 41 can be attached on an inner side of crevice 47 along crevice 47. This reduces a size of load detection device 52.

Note that in strain sensor 41 of the first exemplary embodiment of the present invention, void 49 is formed in the arc shape, but is not limited thereto. It is only required that void 49 is formed so as to surround first strain detection element 44.

Figure 5A:
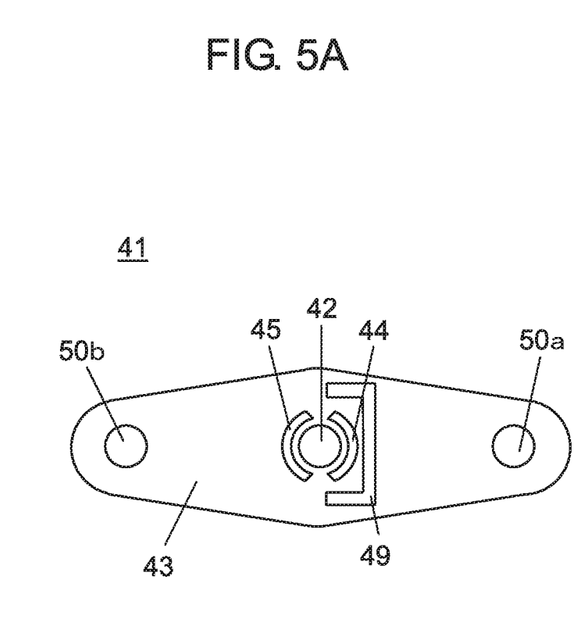
FIG. 5A is a front view of another strain sensor of the first exemplary embodiment of the present invention.

Subsequently, other shapes of strain body 43 of strain sensor 41 will be described with reference to FIGS. 5A to 5C.

The shape of void 49 is not necessarily the arch. For example, a rectangle as illustrated in FIG. 5A may be used. Void 49 having any shape other than the arc or the rectangle may be used, as long as void 49 can make strain body 43 easy to strain and therefore the strain can be detected, when the compressive stress is applied between connecting part 42 and fixing part 50a.

Note that arch-shaped void 49 easily surrounds first strain detection element 44 in strain body 43. Therefore, arch-shaped void 49 is more preferably formed in strain body 43. Then an entire part where first strain detection element 44 is disposed is made easy to strain.

More preferably, void 49 formed up to a direction perpendicular to a line connecting a center of connecting part 42 to a center of fixing part 50a makes the entire part where first strain detection element 44 is disposed easy to strain, when the stress is applied to strain body 43. This improves sensitivity of strain sensor 41.

Figure 5B:
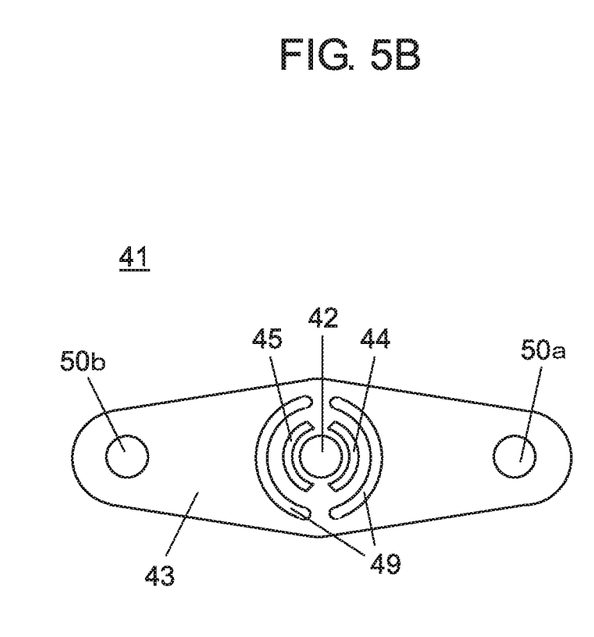
FIG. 5B is a front view of yet another strain sensor of the first exemplary embodiment of the present, invention.

Moreover, in strain sensor 41 of the first exemplary embodiment of the present invention, void 49 is formed only on a side of first strain detection element 44, but may be further disposed on a side of second strain detection element 45 as illustrated in FIG. 5B. With this configuration, a resistance value of second strain detection element 45 is easily changed when external force f is applied to connecting part 42. Then detection accuracy can be improved.

Figure 5C:
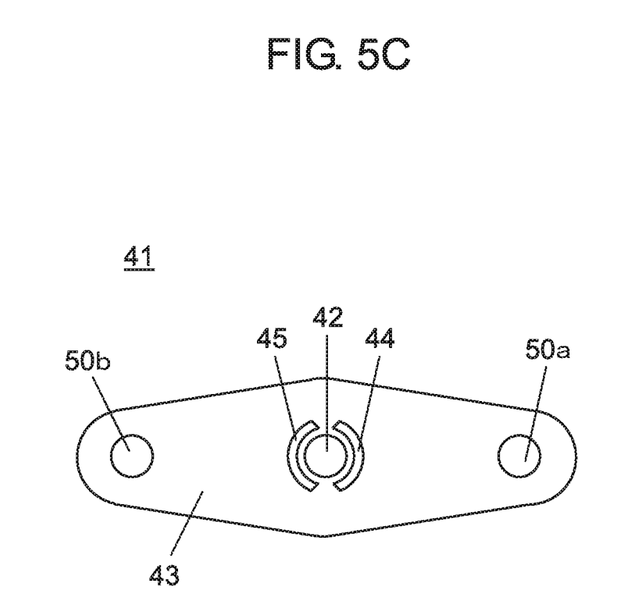
FIG. 5C is a front view of yet, another strain sensor of the first exemplary embodiment, of the present, invention.

Note that void 49 is not necessarily formed, as illustrated in FIG. 5C, as long as first strain detection element 44 can detect the strain generated between connecting part 42 and fixing part 50a (compressive stress).

Variation of First Exemplary Embodiment

Subsequently, a variation of the load detection device of the first exemplary embodiment of the present invention will be described with reference to FIG. 6.

Figure 6:
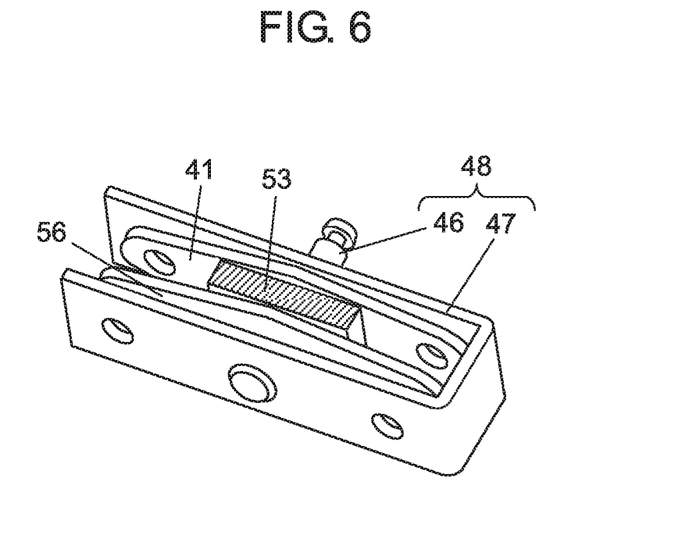
FIG. 6 illustrates a variation of the load detection device of the first exemplary embodiment, of the present invention.

As illustrated in FIG. 6, the variation of the first exemplary embodiment of the present invention includes second strain sensor 56 having the same structure as that of strain sensor 41. Strain sensor 41 and second strain sensor 56 are arranged in parallel with each other so as to interpose input member 53.

When input member 53 attached to crevice pin 46 and strain sensor 41 are apart from each other, the detection sensitivity of strain sensor 41 may be changed depending on a connecting position of input member 53 to crevice pin 46. Crevice pin 46 is supported by strain sensor 41 and crevice 47. Hence, a magnitude of the stress transmitted from crevice pin 46 to strain sensor 41 changes according to the change of connecting position of input member 53 to crevice pin 46. The stress is more easily transmitted to strain sensor 41 as the connecting position of input member 53 to crevice pin 46 is closer to strain sensor 41, resulting in that the detection sensitivity of strain sensor 41 is increased. In contrast, when the connecting position of input member 53 is away from strain sensor 41, the transmitted stress is decreased. In this manner, since the output of strain sensor 41 is changed depending on the connecting position of input member to crevice pin 46, the detection accuracy of strain sensor 41 is decreased.

Then, as illustrated in FIG. 6, second strain sensor 56 having the same structure as that of strain sensor 41 is used so as to interpose input member 53, and the strain generated in strain body 43 is detected by adding strains measured by strain sensor 41 and second strain sensor 56. Thus, a magnitude of the strain measured by strain sensor 41 can be made constant, even when the position of input member 53 is shifted. The structure illustrated in FIG. 6 can further improve the detection accuracy of strain sensor 41.

Second Exemplary Embodiment

Subsequently, a second exemplary embodiment of the present invention will be described with reference to drawings.

Note that with respect to a load detection device and a strain sensor of the second exemplary embodiment of the present invention, constituent elements identical to those of the first exemplary embodiment are denoted by like reference signs and explanations thereof will be omitted.

Figure 7:
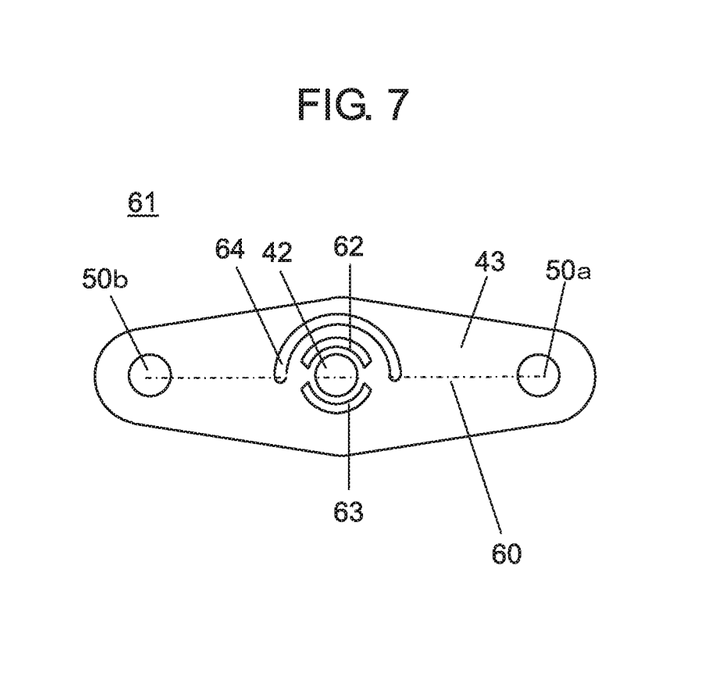
FIG. 7 is a front view of a strain sensor of a second exemplary embodiment of the present invention.

FIG. 7 illustrates the strain sensor of the second exemplary embodiment of the present invention.

As illustrated in FIG. 7, strain sensor 61 of the second exemplary embodiment of the present invention includes plate-shaped strain body 43 disposed with connecting part 42, first strain detection element 62 disposed on strain body 43, and second strain detection element 63. A through hole is formed at a center part of plate-shaped strain body 43, and thus connecting part 42 is formed. Crevice pin 46 is inserted into connecting part 42 to connect connecting part 42 to transmission member 48 including crevice 47 and crevice pin 46. Void 64 having an arc shape is formed near connecting part 42 of strain body 43. First strain detection element 62 is attached between void 64 and connecting part 42. Second strain detection element 63 is disposed at a position opposite to a position where first strain detection element 62 is disposed, relative to connecting, part 42. Note that similar to the first exemplary embodiment described with reference to FIGS. 5A to 5C, the second exemplary embodiment also uses void 64 having the arc shape, but is not limited thereto.

Fixing part 50a and fixing part. 50b are disposed in strain body 43. Screws (not illustrated) are fitted into fixing parts 50a, 50b to fix strain body 43 to input member 53 (illustrated in FIG. 8). First strain detection element 62, second strain detection element 63, and void 64 are arranged in a line in a direction perpendicular to line 60 connecting two fixing parts 50a, 50b.

Figure 8:
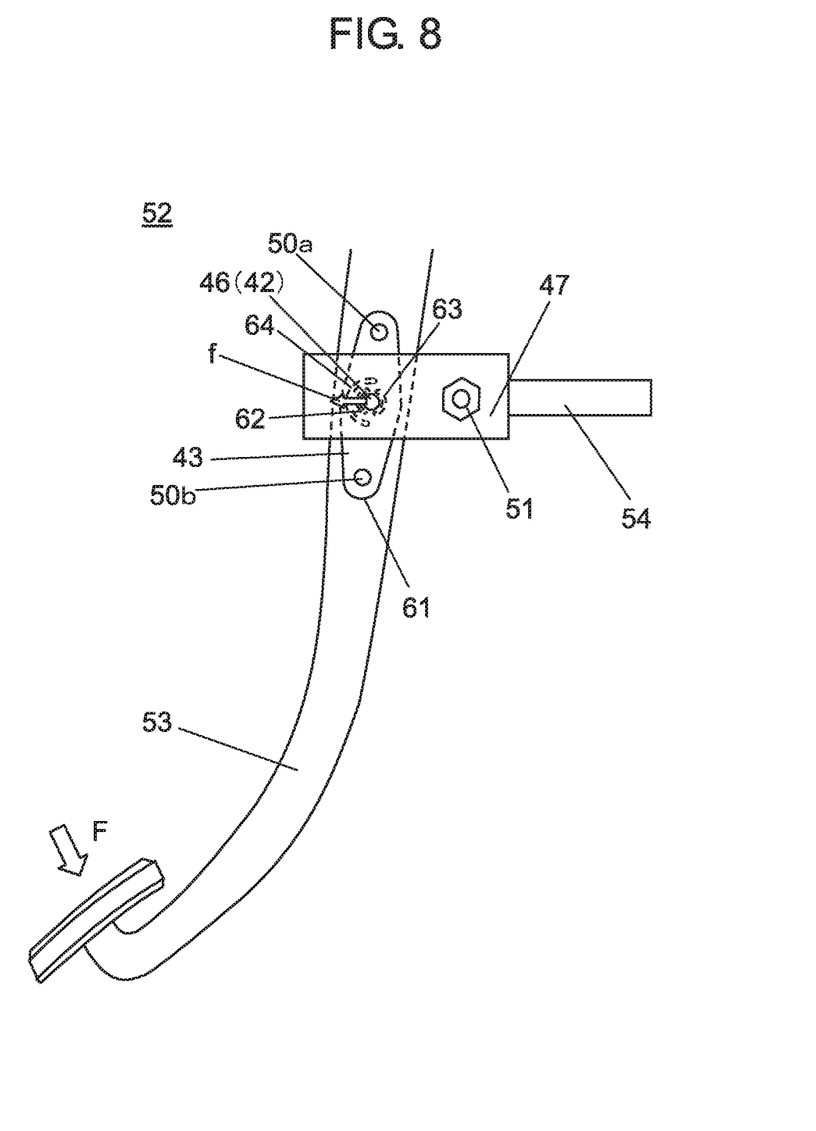
FIG. 8 is a side view of a load detection device of the second exemplary embodiment of the present invention.

FIG. 8 illustrates load detection device 52 using the strain sensor of the second exemplary embodiment.

In load detection device 52 of the second exemplary embodiment of the present invention illustrated in FIG. 8, when pedal force is applied to input member 53 including a pedal arm, pedal force F is transmitted to crevice pin 46 through input member 53, and further is transmitted from crevice pin 46 to operating rod 54 through crevice 47.

Here, in strain body 43, external force f is applied toward a direction indicated by an arrow illustrated in FIG. 8 (left direction) from connecting part 42. In the present exemplary embodiment, connecting part 42, first strain detection element 62, and void 64 are arranged in this order along a direction of the external force applied to the connecting part, and strain sensor 61 is attached to input member 53.

With this configuration, a magnitude of a stress transmitted from input member 53 to strain sensor 61 is not changed, even when a connecting position of input member 53 to crevice pin 46 is shifted. And thus the pedal force is stably detected by only using strain sensor 61. Therefore, pedal force F can be accurately detected.

Note that in the above described first exemplary embodiment of the present invention, the example in which void 49 is formed by using the through hole is described, but the present is not necessarily limited thereto. Void 49 may be formed by using a groove. When void 49 is formed by using the groove, a degree of a strain in first strain detection element 44 becomes smaller, in comparison with a case where void 49 is formed by using the through hole. But first strain detection element 44 strains more easily, in comparison with a case where void 49 is not formed, resulting in that detection sensitivity is improved. Note that the same is true for the second exemplary embodiment.

INDUSTRIAL APPLICABILITY

A strain sensor of the present invention, which detects a strain transmitted from a transmission member, is configured with a small number of components at a reduced cost, and can reduce a size thereof. Therefore, the strain sensor is useful for detecting a treading load of vehicular pedals, a cable tension of a vehicular parking brake, a seat surface load of a vehicular seat, and the like.

REFERENCE MARKS IN THE DRAWINGS 41, 61 strain sensor
42 connecting part
43 strain body
44, 62 first strain detection element
45, 63 second strain detection element
46 crevice pin
47 crevice
48 transmission member
49, 64 void
50a, 50b fixing part
51 screw
52, 65 load detection device
53 input member
54 operating rod
55 region
56 second strain sensor
60 line

The invention claimed is:

1. A strain sensor to be attached to a transmission member, the strain sensor comprising:
    a strain body including a connecting part, a fixing part, and a void; and
    a first strain detection element disposed on the strain body, wherein:
    the strain body is to be fixed to the transmission member by the fixing part,
    the first strain detection element is disposed between the connecting part and the void, and
    the connecting part, the first strain detection element, the void, and the fixing part are arranged in this order, along a direction of external force applied to the connecting part.

2. The strain sensor according to claim 1, further comprising a second strain detection element disposed on the strain body,
   wherein the second strain detection element is disposed at a position opposite to a position where the first strain detection element is disposed so that the connecting part is disposed between the first strain detection element and the second strain detection element.

3. A load detection device comprising:
   the strain sensor according to claim 1;
   an input member to which external force is applied; and
   the transmission member that is connected to the input member and the strain sensor, and transmits the external force,
   wherein the strain sensor is connected to the transmission member so as to be applied with the external force transmitted from the input member to the transmission member.

4. The load detection device according to claim 3, further comprising a second strain sensor,
   wherein the second strain sensor is located at a position opposite to a position where the strain sensor is disposed so that the input member is disposed between the strain sensor and the second strain sensor, and is connected to the input member.

5. A load detection device comprising:
   the strain sensor according to claim 1;
   an input member to which external force is applied; and
   the transmission member that is connected to the input member and transmits the external force,
   wherein the strain sensor is connected to the input member.

6. The strain sensor according to claim 1,
   wherein the first strain detection element detects a compressive stress generated between the connecting part and the fixing part.

7. A strain sensor to be attached to an input member, the strain sensor comprising:
   a strain body including a connecting part, a first fixing part, a second fixing part and a void; and
   a first strain detection element disposed on the strain body, wherein:
   the strain body is to be fixed to the input member by the first fixing part and the second fixing part,
   the first strain detection element is disposed between the connecting part and the void,
   the connecting part, the first strain detection element, and the void are arranged in this order, along a direction of external force applied to the connecting part, and
   the connecting part, the first strain detection element and the void are disposed between the first fixing part and the second fixing part.

8. The strain sensor according to claim 7, further comprising a second strain detection element disposed on the strain body,
   wherein the second strain detection element is disposed at a position opposite to a position where the first strain detection element is disposed so that the connecting part is disposed between the first strain detection element and the second detection element.

9. A load detection device comprising:
   the strain sensor according to claim 7;
   the input member to which external force is applied; and
   a transmission member that is connected to the input member and transmits the external force,
   wherein the strain sensor is connected to the transmission member so as to be applied with the external force transmitted from the input member to the transmission member.

10. The load detection device according to claim 9, further comprising a second strain sensor,
    wherein the second strain sensor is located at a position opposite to a position where the strain sensor is disposed so that the input member is disposed between the strain sensor and the second strain sensor, and is connected to the input member.

11. A load detection device comprising:
    the strain sensor according to claim 7;
    the input member to which external force is applied; and
    a transmission member that is connected to the input member and transmits the external force,
    wherein the strain sensor is connected to the input member.

12. The strain sensor according to claim 7,
    wherein the first strain detection element detects a compressive stress generated between the connecting part and the void.

* * * * *